(12) United States Patent
Clark et al.

(10) Patent No.: US 9,548,867 B2
(45) Date of Patent: Jan. 17, 2017

(54) METHOD AND APPARATUS FOR SECURE DISTRIBUTION OF EMBEDDED FIRMWARE

(71) Applicant: Rockwell Automation Technologies, Inc., Mayfield Heights, OH (US)

(72) Inventors: Daniel Clark, Chardon, OH (US);
James Kay, Chardon, OH (US);
Robert P. Anderson, Denver, CO (US)

(73) Assignee: Rockwell Automation Technologies, Inc., Mayfield Heights, OH (US)

(*) Notice: Subject to any disclaimer, the term of this patent is extended or adjusted under 35 U.S.C. 154(b) by 0 days.

(21) Appl. No.: 14/090,279

(22) Filed: Nov. 26, 2013

(65) Prior Publication Data
US 2015/0149783 A1 May 28, 2015

(51) Int. Cl.
*H04L 9/32* (2006.01)
*G06F 9/445* (2006.01)
*G06F 21/00* (2013.01)

(52) U.S. Cl.
CPC ............ *H04L 9/3263* (2013.01); *G06F 8/65* (2013.01); *G06F 21/00* (2013.01)

(58) Field of Classification Search
CPC ............ G06F 8/61; G06F 8/65; G06F 21/30; H04L 9/3234; H04L 9/3294; H04L 9/3263
USPC ............ 713/2, 175, 176, 191; 717/168, 174; 726/17, 21
See application file for complete search history.

(56) References Cited

U.S. PATENT DOCUMENTS

| 6,401,208 B2 * | 6/2002 | Davis ................. G06F 9/4401 713/187 |
| 8,484,474 B2 | 7/2013 | Batke et al. |
| 2004/0025010 A1* | 2/2004 | Azema ................. G06F 21/10 713/156 |
| 2006/0178757 A1* | 8/2006 | Grgic et al. .......... 700/9 |
| 2007/0113071 A1* | 5/2007 | Lindinger ............ G06Q 20/341 713/156 |

(Continued)

FOREIGN PATENT DOCUMENTS

| EP | 1283397 A2 | 2/2003 |
| EP | 1688840 A2 | 8/2006 |

OTHER PUBLICATIONS

Extended European Search Report dated Feb. 26, 2015; European Patent Application No. 14194836.4—(8) pages.

(Continued)

*Primary Examiner* — Shanto M Abedin
(74) *Attorney, Agent, or Firm* — Boyle Fredrickson, SC (57) ABSTRACT

A method and apparatus to securely distribute embedded firmware to a module in an industrial control system is disclosed. A security certificate corresponding to the firmware is generated utilizing a proprietary algorithm. The certificate includes an identifier corresponding to the module on which the firmware is to be loaded and an identifier corresponding to a removable medium on which the firmware is distributed. The removable medium is inserted into the module in the industrial control system on which the firmware is to be loaded. The module reads the security certificate and verifies that the firmware is intended for the module and verifies that the security certificate includes the identifier for the removable medium which was inserted into the module. If the firmware is intended for the module and the security certificate includes the identifier for the removable medium, the module loads the firmware from the removable medium.

10 Claims, 4 Drawing Sheets

(56) References Cited

U.S. PATENT DOCUMENTS

| | | | |
|---|---|---|---|
| 2008/0159540 A1* | 7/2008 | Maetz et al. | 380/277 |
| 2008/0320471 A1 | 12/2008 | Maeda | |
| 2009/0094597 A1* | 4/2009 | Moskalik | G06F 12/1408 717/174 |
| 2010/0132018 A1* | 5/2010 | Takala et al. | 726/5 |
| 2011/0131421 A1* | 6/2011 | Jogand-Coulomb et al. | 713/189 |
| 2011/0154006 A1* | 6/2011 | Natu | G06F 21/575 713/2 |
| 2011/0289493 A1* | 11/2011 | Keefe et al. | 717/168 |
| 2012/0005480 A1* | 1/2012 | Batke et al. | 713/175 |
| 2012/0060039 A1* | 3/2012 | Leclercq | G06F 21/10 713/189 |
| 2013/0151861 A1* | 6/2013 | Gan | 713/189 |
| 2015/0082420 A1* | 3/2015 | Love | G06F 21/6218 726/16 |

OTHER PUBLICATIONS

European Communication pursuant to Articles 94(3) EPC dated Jan. 25, 2016; European Patent Application No. 14194836.4—(8) pages.

\* cited by examiner

METHOD AND APPARATUS FOR SECURE DISTRIBUTION OF EMBEDDED FIRMWARE

BACKGROUND OF THE INVENTION

The subject matter disclosed herein relates generally to a system and method for providing secure distribution of embedded firmware to modules in an industrial control system and more specifically, for utilizing a proprietary encryption certificate to distribute embedded firmware via a removable medium, such as a Secure Digital (SD) memory card.

An industrial control system typically includes at least one industrial controller configured to execute a control program and multiple modules distributed about the controlled machine or process. Industrial controllers are specialized computer systems used for the control of industrial processes or machinery, for example, in a factory environment. Generally, an industrial controller executes a stored control program that reads inputs from a variety of sensors associated with the controlled process and machine and, sensing the conditions of the process or machine and based on those inputs and a stored control program, calculates a set of outputs used to control actuators controlling the process or machine.

Industrial controllers differ from conventional computers in a number of ways. Physically, they are constructed to be substantially more robust against shock and damage and to better resist extreme environmental conditions than conventional computers. The processors and operating systems are optimized for real-time control and are programmed with languages designed to permit rapid development of control programs tailored to a constantly varying set of machine control or process control applications.

Generally, the industrial control systems have a highly modular architecture, for example, that allows different numbers and types of input and output modules to be used to connect the industrial controller to the process or machinery to be controlled. This modularity is facilitated through the use of special "control networks" suitable for highly reliable and available real-time communication. Such control networks (for example, ControlNet, EtherNet/IP) differ from standard communication networks (e.g. Ethernet) by guaranteeing maximum communication delays, by pre-scheduling the communication capacity of the network, and/or providing redundant communication capabilities for high-availability.

As part of their enhanced modularity, industrial control systems may employ modules that are configurable to perform different functions. A module may include, for example, sockets or slots configured to receive additional hardware such as an option card. Different option cards may be configured to execute different functions yet may be plugged into the same socket or slot. Optionally, a module may include all of the hardware components to perform several different functions. However, the hardware components may require a specific firmware and/or configuration in order to enable the hardware and the respective functions. Even if a module is not configurable, it likely includes a processor executing firmware to perform its intended function.

The increased reliance on firmware in the modules in an industrial control system presents certain challenges. On occasion, it may be necessary to provide new firmware to the module. For example, the firmware may receive an upgrade to improve performance and/or correct a problem in the module. Alternately, a customer may alter the configuration of their control system and desire a different set of functions in the module be enabled. However, as is known in the art, many utilities exist to copy software files. Consequently, it is not desirable to simply transmit a new firmware file to a client for installation in the module. A client may, for example, purchase an upgrade for a single module and install the new software in multiple modules. Similarly, the potential exists for the software file to be loaded onto a computer or server, publicly accessible, for example, via the Internet. The firmware would then be available to all users of the module without purchase of an upgrade.

Thus, it would be desirable to provide an improved method for secure distribution of embedded firmware.

BRIEF DESCRIPTION OF THE INVENTION

The subject matter disclosed herein describes a method and apparatus to securely distribute embedded firmware to a module in an industrial control system. A security certificate corresponding to the firmware is generated utilizing a proprietary algorithm. The certificate includes an identifier corresponding to the module on which the firmware is to be loaded and an identifier corresponding to a removable medium, such as a SD memory card, on which the firmware is distributed. The removable medium is inserted into the module in the industrial control system on which the firmware is to be loaded. The module reads the security certificate and verifies that the firmware is intended for the module and verifies that the security certificate includes the identifier for the removable medium which was inserted into the module. If the firmware is intended for the module and the security certificate includes the identifier for the removable medium, the module loads the firmware from the removable medium.

According to one embodiment of the invention, an apparatus for providing firmware to a module in an industrial control system is disclosed. The apparatus includes a removable storage medium, a firmware file, and a certificate. The module includes a first identifier corresponding to the module, and the removable storage medium includes a second identifier corresponding to the removable storage medium. The firmware file is stored on the removable storage medium and defines, at least in part, operation of the module. The certificate is also stored on the removable storage medium and includes a copy of the first identifier corresponding to the module and a copy of the second identifier corresponding to the removable storage medium. The certificate is configured to be read by the module to permit the module to load the firmware file to the module when the copy of the first identifier in the certificate matches the first identifier included on the module and the copy of the second identifier in the certificate matches the second identifier on the removable storage medium.

According to another embodiment of the invention, a method of providing secure distribution of embedded firmware for a module in an industrial control system is disclosed. A removable storage medium is inserted into a receptacle on the module, and a certificate stored on the removable storage medium is read with the module. The module verifies that the certificate includes a copy of a first identifier corresponding to the module and a copy of a second identifier corresponding to the removable storage medium. A firmware file is loaded from the removable storage medium to the module when the copy of the first identifier in the certificate matches the first identifier included on the module and the copy of the second identifier in the certificate matches the second identifier on the removable storage medium.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which.

In describing the various embodiments of the invention which are illustrated in the drawings, specific terminology will be resorted to for the sake of clarity, However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION OF THE PREFERRED EMBODIMENTS

Figure 1:
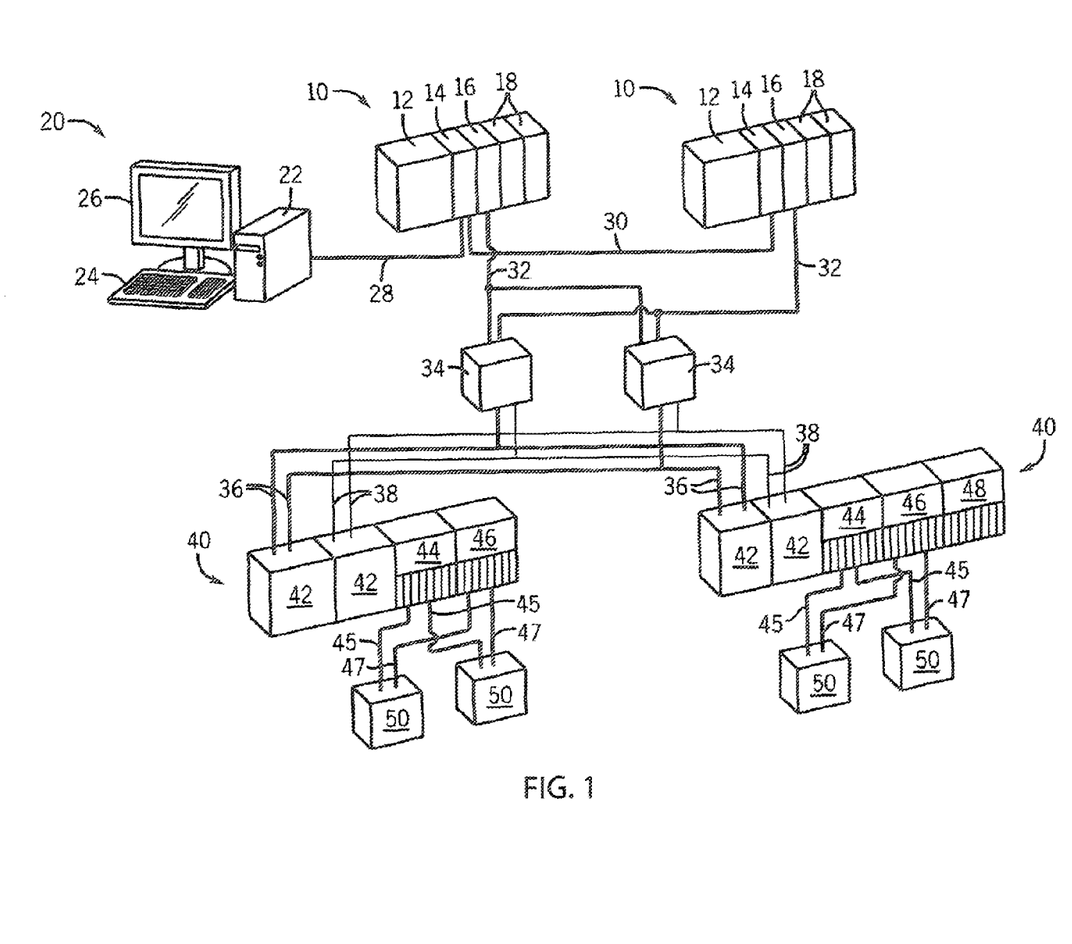
FIG. 1 is a schematic representation of an exemplary industrial control system incorporating modules which may receive embedded firmware according to one embodiment of the invention.

Turning initially to FIG. 1, an exemplary industrial control network includes a pair of industrial controllers 10. As illustrated, the industrial controller 10 is modular and may be made up of numerous different modules connected together in a rack or mounted to a rail. Additional modules may be added or existing modules removed and the industrial controller 10 reconfigured to accommodate the new configuration. Optionally, the industrial controller 10 may have a predetermined and fixed configuration. Each of the illustrated industrial controllers 10 includes a power supply module 12, processor module 14, and network module 16. Each industrial controller 10 is further shown with two additional modules 18 that may be selected according to the application requirements and may be, for example, analog or digital input or output modules.

One or more operator interfaces 20 may be connected to the industrial control network. Each operator interface 20 may include a processing device 22, input device 24, including, but not limited to, a keyboard, touchpad, mouse, trackball, or touch screen, and a display device 26. It is contemplated that each component of the operator interface may be incorporated into a single unit, such as an industrial computer, laptop, or tablet computer. It is further contemplated that multiple display devices 26 and/or multiple input devices 24 may be distributed about the controlled machine or process and connected to one or more processing devices 22. The operator interface 20 may be used to display operating parameters and/or conditions of the controlled machine or process, receive commands from the operator, or change and/or load a control program or configuration parameters. An interface cable 28 connects the operator interface 20 to one of the industrial controllers 10.

The industrial controllers 10 are connected to other devices by one or more networks according to the application requirements. As illustrated, an interface cable 30 directly connects each of the processor modules 14. A redundant network topology is established by connecting the network interface module 16 of both industrial controllers 10 to each of a pair of switches 34 by a network cable 32. Each switch 34 is connected to one of a pair of remote racks 40 by to suitable network cable 36, 38. It is contemplated that the interface cable 30 or any of the network cables 32, 36, 38 may be a custom cable configured to communicate via a proprietary interface or may be any standard industrial network, including, but not limited to, Ethernet/IP, DeviceNet, or ControlNet. Each network module 16 and switch 34 is configured to communicate according to the protocol of the network to which it is connected and may be further configured to translate messages between two different network protocols.

Each remote rack 40 may be positioned at varying positions about the controlled machine or process. As illustrated, each remote rack 40 is modular and may be made up of numerous different modules connected together in a rack or mounted to a rail. Additional modules may he added or existing modules removed and the remote rack 40 reconfigured to accommodate the new configuration. Optionally, the remote rack 40 may have a predetermined and fixed configuration. As illustrated, each remote rack 40 includes a pair of network modules 42, each network module 42 connected to one of the redundant networks, an input module 44, and an output module 46. Each of the input modules 44 is configured to receive input signals 45 from controlled devices 50, and each of the output modules 46 is configured to provide output signals 47 to the controlled devices 50. Optionally, still other modules 48 may be included in the remote rack 40. It is understood that the industrial control network, industrial controller 10, and remote racks 40 may take numerous other forms and configurations without deviating from the scope of the invention.

Figure 2:
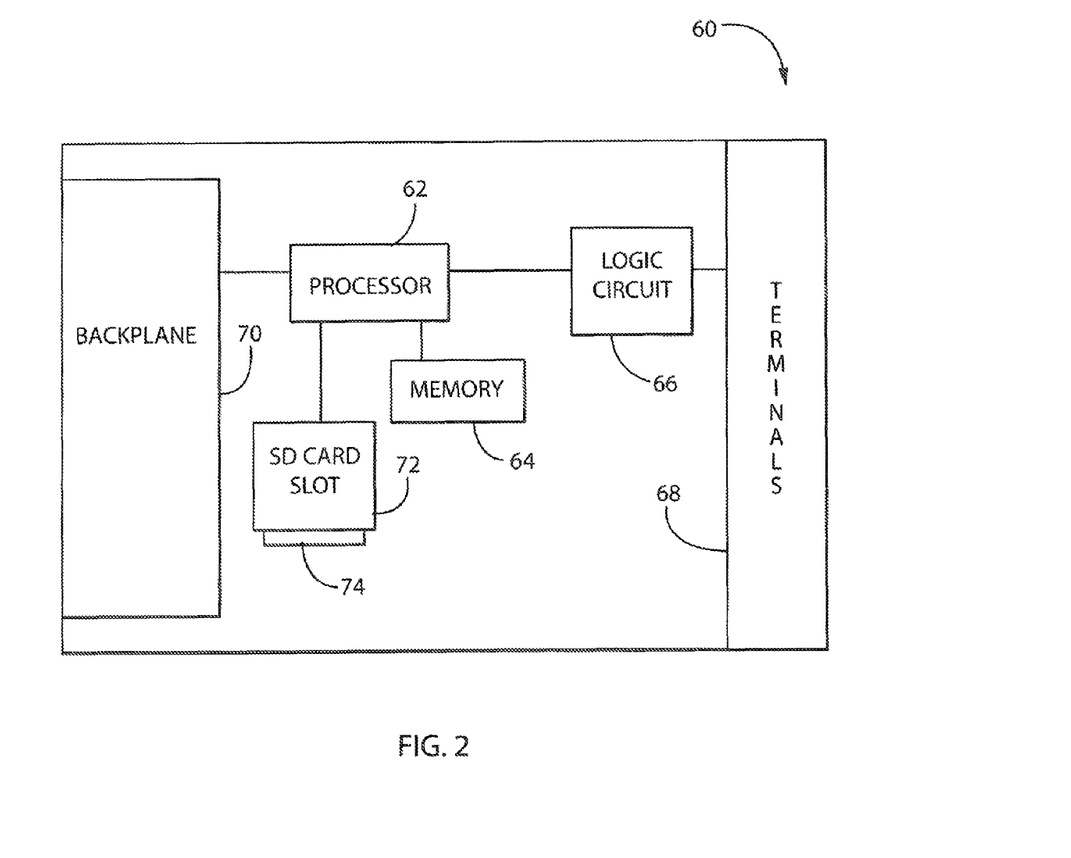
FIG. 2 is a block diagram representation of an exemplary module from the industrial control system of FIG. 1.

Turning next to FIG. 2, an exemplary module 60 from the industrial control network of FIG. 1 is illustrated. The exemplary module 60 is not intended to be limiting and may be, for example, an input, or output module connected in a rack from one of the industrial controllers 10 or in one of the remote racks 40. Optionally, the exemplary module 60 may be a special function module such as a processor module 14 or network interface module 16. According to still other embodiments, the exemplary module 60 may perform other functions. The exemplary module 60 is intended to illustrate components common in any of the modules configured to receive embedded firmware via the secure distribution method disclosed herein. The exemplary module 60 includes a processor 62 and a memory device 64. The processor 62 is configured to execute instructions and to access or store operating data and/or configuration parameters stored in the memory device 64. The processor 62 may be any suitable processor according to the node requirements. It is contemplated that the processor 62 may include a single processing device or multiple processing devices executing in parallel and may be implemented in separate electronic devices or incorporated on a single electronic device, such as a field programmable gate array (FPGA) or application specific integrated circuit (ASIC). Similarly, the memory device 64 may be a single device, multiple devices or may be incorporated in part or in whole within the FPGA or ASIC. The memory device 64 may include volatile memory, nonvolatile memory, or a combination thereof The module 60 may be configured to communicate with other modules mounted in the same rack or contained within a single housing via a backplane and a corresponding backplane connector 70. Optionally, the module may communicate with other modules via a network interface and associated network media according to a corresponding network protocol. The module 60 includes terminals 68 configured to be connected to external devices to receive input signals, transmit output signals, or a combination thereof An additional logic circuit 66 may be included between the processor 62 and the terminals 68 to convert the input and output signals between the proper signals for communication with external devices and the proper signals for communication with the processor 62. It is contemplated that the logic circuit 66 may be implanted via separate electronic devices, incorporated into a single device, such as a FPGA or ASIC, or a combination thereof.

The exemplary module 60 also includes a removable storage device. According to the illustrated embodiment, the module 60 includes a Secure Digital (SD) memory card slot 72. An SD memory card 74 may be inserted into and removed from the SD memory card slot 72. Optionally, the module 60 may include an integrated circuit (IC) socket configured, for example, to receive a plastic leaded chip earner (PLCC) package IC chip, and a corresponding PLCC IC chip may be inserted to and removed from the socket. It is contemplated that still other configurations of removable storage devices and corresponding receptacles may be utilized without deviating from the scope of the invention.

Each module 60 includes a program stored in the memory device 64 for execution by the processor 62. The program is configured to control operation of the module and is retained in non-volatile memory through a power cycle. The program is also referred to herein as firmware. Initially, the program may be loaded into the memory device 64 when the module 60 is manufactured. The firmware supports, for example, the boot functions, runtime control functions, interrupt handling, background functions, communication functions, and other functions of the module 60 according to the module specifications. It is contemplated that the firmware may include either a single program or multiple programs.

Figure 3:
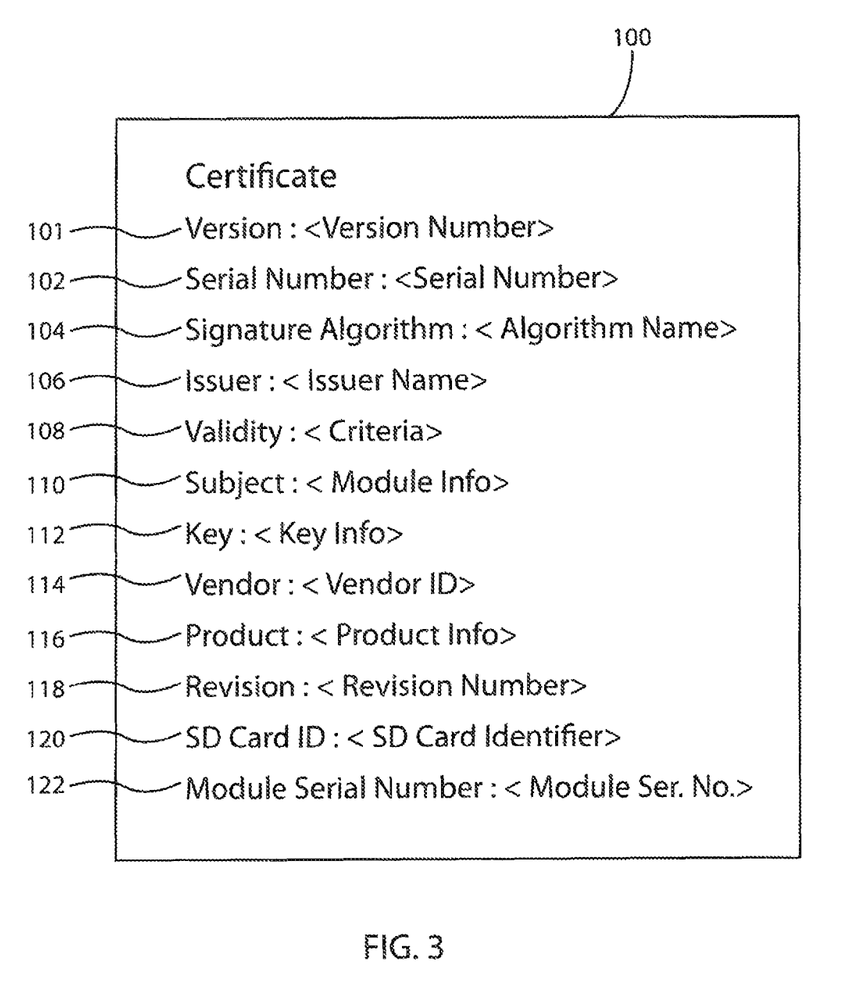
FIG. 3 is a block diagram representation of an exemplary certificate according to one embodiment of the invention.

Newer revisions of the same firmware and/or different firmware may be loaded into the module 60. However, it is desirable to prevent unauthorized firmware from being loaded into the module 60. Thus, the firmware may include a certificate 100 used to authenticate the firmware. With reference to Fig. 3, the certificate 100 may include, but is not limited to, fields identifying a version 101 of the firmware, a serial number 102 of the firmware, a signature algorithm 104 used to generate the certificate, the issuer 106 of the firmware, validity criteria 108, module information 110, a key 112 used to encrypt and/or decrypt the certificate, vendor identification 114, product information 116, a revision number 118, a SD card identifier 120, and/or a module serial number 122 for a particular instance of a module 60. It is contemplated that the certificate 100 may include some or all of the fields illustrated or further include still additional fields without deviating from the scope of the invention. The certificate 100 may be encrypted according to a proprietary process by the vendor of the firmware and/or the vendor of the module prior to release to the module 60. The module 60 is configured to identify and decrypt the certificate to confirm that the firmware is valid prior to loading the firmware on to the module 60.

Figure 4:
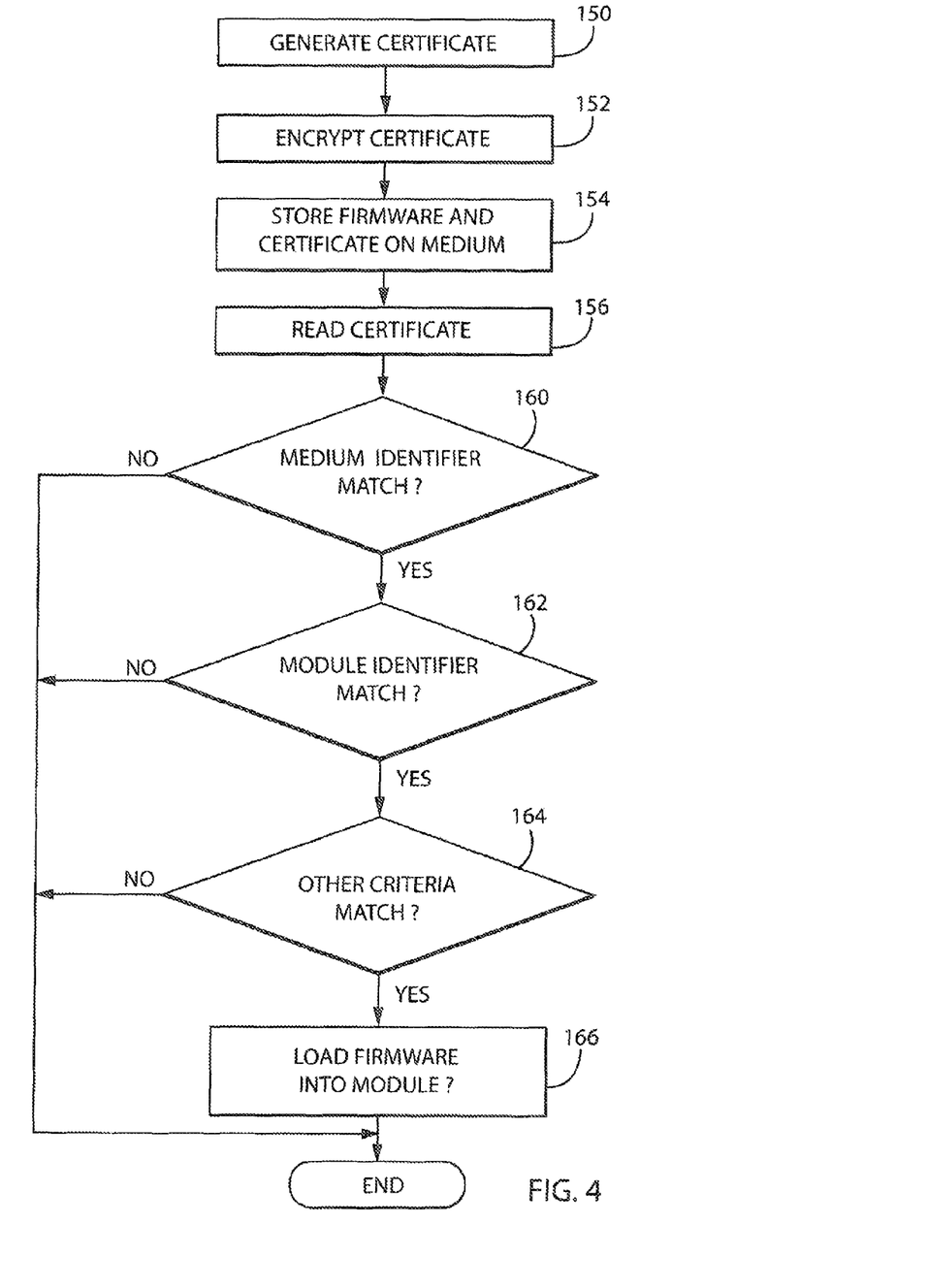
FIG. 4 is a flowchart illustrating the steps in a load process to install new firmware in a module according to one embodiment of the invention.

Referring next to FIG. 4, when new firmware is generated for a module 60, the firmware vendor also generates a certificate 100 associated with the firmware, as shown in step 150. The firmware vendor populates as many of the fields for the certificate 100 as appropriate for the firmware. At least one of the fields in the certificate 100 is an identifier of the module 60 on which the firmware is to be loaded. This field may be, for example, the subject field 110 shown in FIG. 3. Another of the fields includes an identifier corresponding to the removable storage medium 74 on which the firmware is to be stored. An SD memory card 74, for example, includes an identifier written in a read-only segment of the SD memory card 74 by the memory card manufacturer. The SD card identifier may be loaded into the SD card ID field 120 shown in FIG. 3. The certificate 100 is then encrypted by a proprietary encryption algorithm, as shown in step 152. According to one embodiment of the invention, the certificate is generated and encrypted according to the methods disclosed in U.S. Pat. No. 8,484,474, entitled Methods for Firmware Signature. The '474 patent and the present application are commonly owned by Rockwell Automation Technologies, and the contents of the '474 patent arc hereby incorporated by reference in their entirety.

According to one aspect of the invention, it may be desirable to generate firmware that has a limited duration of time during which the firmware may be executed. For example, a demo version of firmware may be provided to a customer to try a new feature of the firmware. The vendor may allow the customer to execute the demo version for a short period, such as a one month trial. As another example, a vendor may issue a pre-release version of software for evaluation or use by select customers in advance of a general release. The firmware may be limited to use until the general release date at which time the general release of the firmware would be installed. The validity field 108 may include an initial date and a final date on which the firmware is valid. These dates may be utilized by the module 60 such that the firmware is only executable between these dates.

According to another aspect of the invention, it may be desirable to generate firmware for a specific instance of a module 60. For example, a customer may have ordered a module 60 for which a serial number has been assigned. The customer initially ordered a base version of the firmware and wishes to add additional features to the module 60. The vendor may include a firmware file which includes either configuration parameters for the new features and/or new control software to execute the new features. The module serial number field 122 may include the serial number for the module 60 such that the firmware may only be installed on the particular module 60. Optionally, multiple serial numbers may be included in the module serial number field 122. If the customer has multiple instances of the module 60 to upgrade, a single SD memory card 74 may be sent out and each of the instances of the module 60 may then be upgraded.

With reference to step 154 of FIG. 4, after the firmware file and corresponding certificate 100 have been generated and/or encrypted, the firmware file and certificate 100 are stored on the removable medium corresponding to the identifier in the SD card ID field 120 included in the certificate. Thus, the firmware file and certificate 100 are associated with a particular SD memory card 74. The SD memory card 74 may then be shipped to the customer or to a field installation to update the firmware on a module 60 in the industrial control system.

The module 60 is configured to verify the certificate 100 prior to loading the firmware file onto the module 60. Referring still to FIG. 4, the module 60 is configured to read the certificate 100 from the SD memory card 74, as shown in step 156. The module 60 includes a proprietary decryption algorithm to decode and read the fields from the certificate 100. According to one embodiment of the invention, the module decrypts the certificate according to the methods disclosed in U.S. Pat. No. 8,484,474, entitled Methods for Firmware Signature. At step 160, the module 60 reads the SD card ID field 120 from the certificate 100 and also reads the read-only segment of memory on the SD memory card 74 to retrieve the identifier corresponding to the SD memory card 74. If the copy of the identifier in the certificate 100 does not match the identifier on the SD memory card 74, the certificate may have become corrupted or the file may have been copied from the original medium to another medium. As a result, the module 60 ends the load process when the copy of the SD memory card identifier does not match the SD memory card identifier.

If the copy of the SD memory card identifier in the certificate 100 matches the identifier on the SD memory card 74, the module 60 continues with the load process. At step 162, the module 60 reads the subject field 110 from the certificate 100 and compares the copy of the module identifier to the corresponding identifier stored in the module 60. The module identifier may identify the module 60 more generally including, for example, a type of module 60 and/or a product code indicating features available on the module 60. If the copy of the identifier in the certificate 100 does not match the identifier in the module 60, the certificate may have become corrupted or the file is not intended for that particular module 60. As a result, the module 60 ends the load process when the copy of the module identifier does not match the module identifier.

If the copy of the module identifier in the certificate 100 matched the identifier in the module 60, the module 60 continues with the load process. At step 164, the module 60 determines whether any further criteria in the certificate 100 are required to match prior to loading and/or running the firmware. For example, if the module serial number field 122 is populated, identifying a specific module, or modules, the module 60 checks whether the serial number, or one of the serial numbers, matches the serial number of the module 60. Similarly, if the validity field 108 includes other criteria, such as a range of dates for which the firmware is valid, the module 60 copies the range of dates into the module 60. Using an internal clock within the module 60, the module 60 is then permitted to execute the firmware when the clock indicates that the date is within range of dates provided in the certificate 100. If all of the criteria match, the module 60 loads the firmware from the SD memory card 74 into the module, as shown in step 166.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

We claim:

1. An apparatus for providing firmware to a module in an industrial control system, wherein the module includes a first identifier corresponding to the module, the apparatus comprising:

a removable storage medium for distributing the firmware, wherein the removable storage medium includes a second identifier corresponding to the removable storage medium and wherein the second identifier is written in a read-only segment on the removable storage medium by a manufacturer of the removable storage medium;

a firmware file stored on the removable storage medium, wherein the firmware file is executable by the module to control, at least in part, operation of the module when loaded on the module; and a certificate used to authenticate the firmware file and stored on the removable storage medium, wherein:

the certificate includes a copy of the first identifier corresponding to the module and a copy of the second identifier corresponding to the removable storage medium, and the certificate is configured to be read by the module to permit the module to load the firmware file to the module when the copy of the first identifier in the certificate matches the first identifier included on the module and the copy of the second identifier in the certificate matches the second identifier on the removable storage medium.

2. The apparatus of claim 1 wherein the removable storage medium is a secure digital (SD) memory card.

3. The apparatus of claim 1 wherein the certificate includes a predefined duration during which the firmware file is valid.

4. The apparatus of claim 1 wherein the certificate includes a copy of a serial number corresponding to a particular instance of the module and wherein the certificate is further configured to permit the module to load the firmware file when the copy of the serial number in the certificate matches the serial number of the module.

5. The apparatus of claim 1 wherein the firmware file is a configuration file to enable at least one additional feature of an application program configured to execute on the module.

6. The apparatus of claim 1 wherein the firmware file is a new revision of an existing firmware file loaded on the module.

7. A method of providing secure distribution of embedded firmware for a module in an industrial control system, the method comprising the steps of:

inserting a removable storage medium into a receptacle on the module;

reading a certificate stored on the removable storage medium to authenticate the firmware file with the module;

verifying on the module that the certificate includes a copy of a first identifier corresponding to the module and a copy of a second identifier corresponding to the removable storage medium, wherein the second identifier is written in a read-only segment on the removable storage medium by a manufacturer of the removable storage medium; and loading a firmware file from the removable storage medium to the module when the copy of the first identifier in the certificate matches the first identifier included on the module and the copy of the second identifier in the certificate matches the second identifier on the removable storage medium, wherein the firmware file is executable by the module to control, at least in part, operation of the module when loaded on the module.

8. The method of claim 7 wherein the removable storage medium is a secure digital (SD) memory card.

9. The method of claim 7 wherein the certificate includes a. predefined duration during which the firmware file is valid, further comprising the step of loading the predefined duration from the removable storage medium to the module.

10. The method of claim 7 wherein the certificate includes a copy of a serial number corresponding to a particular instance of the module and wherein the module is further permitted to load the firmware file when the copy of the serial number in the certificate matches the serial number of the module.

\* \* \* \* \*